(12) United States Patent
Planson et al.

(10) Patent No.: US 9,751,429 B2
(45) Date of Patent: Sep. 5, 2017

(54) DEVICE FOR ADJUSTING THE SEAT LENGTH FOR A MOTOR VEHICLE SEAT AND SEAT COMPRISING SUCH A DEVICE

(75) Inventors: Jerome Planson, Angerville (FR); Bernard Pradier, Saint Michel sur Orge (FR); Charles-Louis Ducrohet, Sevres (FR); Laurent Chabert, Cerny (FR); Nicolas Navatte, Flers (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 233 days.

(21) Appl. No.: 13/984,261

(22) PCT Filed: Feb. 6, 2012

(86) PCT No.: PCT/FR2012/050252
§ 371 (c)(1),
(2), (4) Date: Oct. 21, 2013

(87) PCT Pub. No.: WO2012/107675
PCT Pub. Date: Aug. 16, 2012

(65) Prior Publication Data
US 2014/0292051 A1 Oct. 2, 2014

(30) Foreign Application Priority Data
Feb. 8, 2011 (FR) ..................................... 11 51003

(51) Int. Cl.
*B60N 2/02* (2006.01)

(52) U.S. Cl.
CPC ......... *B60N 2/0232* (2013.01); *B60N 2/0284* (2013.01); *B60N 2002/024* (2013.01); *B60N 2002/0236* (2013.01)

(58) Field of Classification Search
CPC ................ B60N 2/0284; B60N 2/0232; B60N 2002/0236; B60N 2002/024; B60N 2/0242
See application file for complete search history.

(56) References Cited

U.S. PATENT DOCUMENTS 7,192,087 B2 * 3/2007 Adragna et al. ......... 297/284.11
7,871,126 B2 * 1/2011 Becker et al. ........... 297/284.11
(Continued)

FOREIGN PATENT DOCUMENTS

CN 103492223 A 1/2014
DE 10222995 C1 6/2003
(Continued)

OTHER PUBLICATIONS

Simin Baharlou, "Related International Application No. PCT/FR2011/050252", "International Preliminary Report on Patentability", Aug. 8, 2013, Publisher: PCT, Published in: FR.
(Continued)

*Primary Examiner* — David R Dunn
*Assistant Examiner* — Tania Abraham
(74) *Attorney, Agent, or Firm* — Kaplan Breyer Schwarz, LLP

(57) ABSTRACT

The invention relates to a device for adjusting seat length, comprising a seat front plate (12) that is movable relative to a seat frame (11), the plate (12) being mounted on a carriage that is slidably guided on a stationary mounting attached above said frame, the carriage and the mounting being situated between the frame and the seat front plate. The device comprises motor-driven control means for controlling the sliding of the carriage relative to the stationary mounting, the motor-driven control means (4) including a motor (43) arranged near the front of the seat, in front of the frame (1) and beneath the path of the seat front plate (12).

13 Claims, 3 Drawing Sheets

(56) References Cited

U.S. PATENT DOCUMENTS

Figure 1:
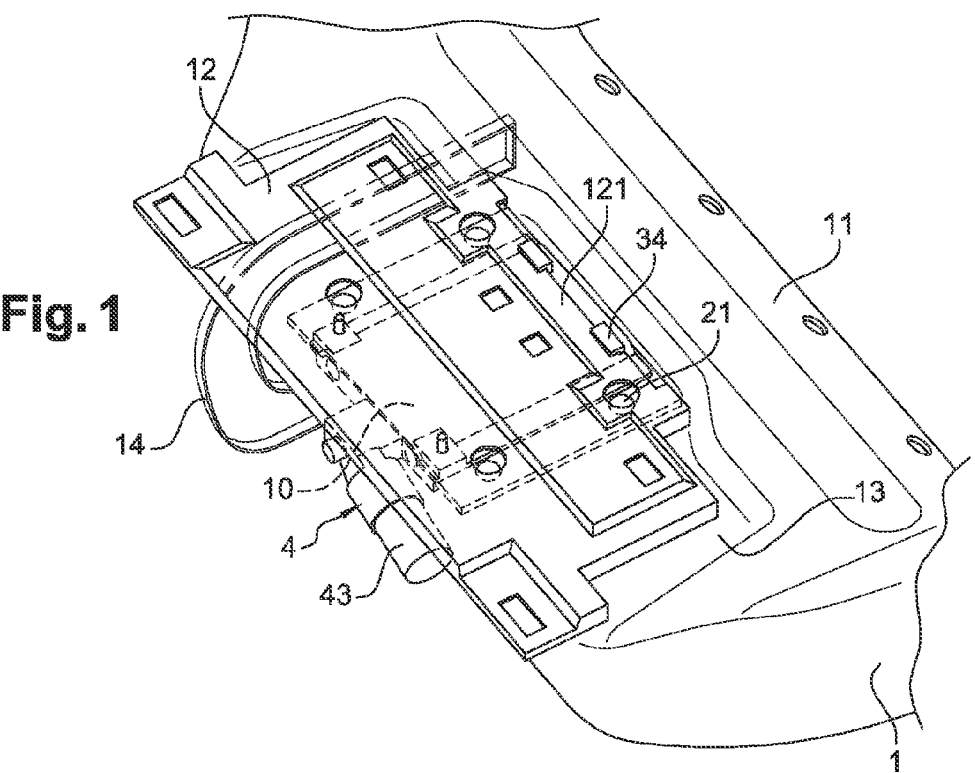

| | | |
|---|---|---|
| 8,579,373 B2 | 11/2013 | Pradier et al. |
| 2008/0157578 A1* | 7/2008 | Snyder ........................ 297/311 |
| 2008/0174162 A1* | 7/2008 | Becker et al. ............... 297/311 |
| 2009/0033134 A1* | 2/2009 | Hofmann et al. ........... 297/311 |
| 2009/0039690 A1* | 2/2009 | Simon et al. ............. 297/344.1 |
| 2009/0152920 A1* | 6/2009 | Gumbrich et al. ........ 297/284.1 |

FOREIGN PATENT DOCUMENTS

| | | |
|---|---|---|
| DE | 10227730 C1 | 8/2003 |
| DE | 202006001969 U1 | 7/2007 |
| DE | 102007049865 A1 | 7/2008 |
| DE | 102008030608 A1 | 2/2009 |
| DE | 102008046000 A1 | 6/2009 |
| DE | 102008006547 A1 | 8/2009 |
| DE | 102008009440 A1 | 8/2009 |
| DE | 102008049923 A1 | 8/2009 |
| EP | 2673162 A1 | 12/2013 |
| FR | 2958889 A1 | 10/2011 |
| JP | 2014504933 A | 2/2014 |
| WO | 2010057335 A1 | 5/2010 |

OTHER PUBLICATIONS

Davila J. Gonzalez, "Related International Patent Application No. PCT/FR2012/050252 International Search Report", Apr. 12, 2012, Publisher: PCT, Published in: EP \* cited by examiner

DEVICE FOR ADJUSTING THE SEAT LENGTH FOR A MOTOR VEHICLE SEAT AND SEAT COMPRISING SUCH A DEVICE

The present invention relates to motor vehicle seats which comprise a seat bottom piece having a length adjustable to the user's morphology. Such seats enable to adapt the support length provided by the seat bottom piece to the length of the user's legs, to provide more comfort by supporting the thighs all the way to the bend of the knee.

Seats of known type comprise for this purpose a seat bottom piece comprising a seating cushion of adjustable length. To enable to adjust this cushion length, it is known to only displace the front portion of the cushion, or seat nose, from front to back.

Known systems comprise a plate for supporting the seat nose assembled, slidably in the front-to-back direction, on a front crosspiece of the seating frame. The plate is assembled on a carriage sliding in a slide rail formed on a fixed support placed on the crosspiece. Some of these systems are manually operated, and other are motor-driven.

To provide the sliding of the carriage, most known motor-driven adjustment devices use a rack and pinion system, where the pinion is rotated by a motor. Such devices are generally very complicated and at least partly arranged under the seating frame, which requires intervening both under the seat crosspiece and above it to assemble the device. Further, according to whether a manual version or a motor-driven version of the device is desired to be used, it may be necessary to adapt the frame. Such devices are not really modular.

In certain systems, for example, disclosed in DE102008049923, the rack is connected to the mobile carriage and the pinion is rotatably assembled in fixed position on the support, the motor being then also fixed with respect to the seating frame. All the guiding and driving parts are placed above the seating frame, which eases its assembly thereon, but the motor remains under the frame, which occupies a significant volume under the seat. Further, such a system for guiding the seat nose is not modular either, which does not enable to perform a simple adaptation according to whether the control is manual or motor-driven.

In other systems, for example, disclosed in DE-10227730 or DE-202006001969, the driving is performed by a screw-nut system, all the guiding and driving means being also arranged under the frame and thus also occupying a significant volume under the seat. DE-202006001969 also shows a system where the driving is performed by a screw-nut system, but here again, the sliding guide carriage is located under the frame, and thus occupies a significant volume under the seat.

The present invention especially aims at solving the above-mentioned problems. It more specifically aims at providing a guiding and driving device which is as flat as possible to be able to be integrally located above the seating frame, with no motor or other part under it, and without however occupying such a volume above the armature as to have to decrease the thickness of the seating nose cushion to compensate for this bulk of the mechanism. It also aims at ensuring the modularity of the device, by enable to use the maximum possible number of common parts between the motor-driven version of the device and a manual version thereof.

To achieve these objects, the invention aims at a device for adjusting the seating length for a motor vehicle seat, comprising a seat nose plate mobile with respect to a seating frame, the plate being assembled on a carriage slidably driven on a fixed support fixed above said frame, the carriage and the support being located between the frame and the seat nose plate, and the device comprising motor-driven control means for controlling the sliding of the carriage with respect to the fixed support.

According to the invention, in the adjustment device, the motor-driven control means comprise a motor arranged towards the front of the seat, in front of the frame and under the trajectory of the seat nose plate, more specifically under the trajectory of the plate and of the carriage, and the motor is hidden by the padding of the seat nose.

Such a forward situation of the frame, in front of the frame having the seat nose slidably assembled thereon, thus generates no height increase of the bulk between the frame and the seat nose, since it is located in front of the seating frame crosspiece and under the seat nose plate, and no longer occupies a volume under the frame either. The inevitable bulk of the motor is transferred to the front edge of the seat nose plate, inside of the padded portion of the front of the seat nose. The motor is thus hidden by the padding of the seat nose.

According to seats, said frame may be fixed or mobile, or may comprise a main portion and an intermediate portion mobile with respect to the main portion. The frame having the motor arranged in front of it according to the invention thus is, according to cases, the main frame if there is not intermediate frame or an intermediate frame in front of the main frame and, in all cases, it is the frame having the seat nose slidably assembled thereon.

It should also be specified that "motor" here generally means the actual electric motor as well as the reducer conventionally associated therewith to form a geared motor.

According to a preferred configuration, the motor is fixed with respect to the seating frame, more preferably still fixed on the fixed support. When the seat nose is in maximum backwards position, the motor bulk is located inside of the seat nose padding, as indicated hereabove. When the seat nose is moved forwards, the carriage passes above the motor, which thus does not hinder the sliding of the carriage and, further, remains protected by the carriage and the seat nose plate.

Further, especially when the motor is connected to the fixed support, it is possible to pre-assemble all the device components, including the motor, and it is then sufficient to mount this assembly on the seating frame, from the top, without requiring to also intervene from the bottom of the frame. The seat nose may also be fixed to the support previously assembled on the carriage, or the support, pre-assembled with the seat nose, may be simply assembled on the carriage.

According to another preferred configuration, the driving of the carriage in translation is provided by a screw-nut system, having its screw arranged longitudinally along the carriage sliding direction, is rotated by the motor, and the nut is fastened to the carriage. The small bulk of the screw and of the nut, between the carriage and the fixed support, enables to keep a minimum height for the assembly.

The invention also aims at a motor vehicle seat having a seat bottom piece of adjustable length, comprising a device for adjusting the seating length such as previously defined.

Other features and advantages will appear from the description which will be made of an embodiment of a device for adjusting the seating length of a motor vehicle seat according to the invention.

Figure 6:
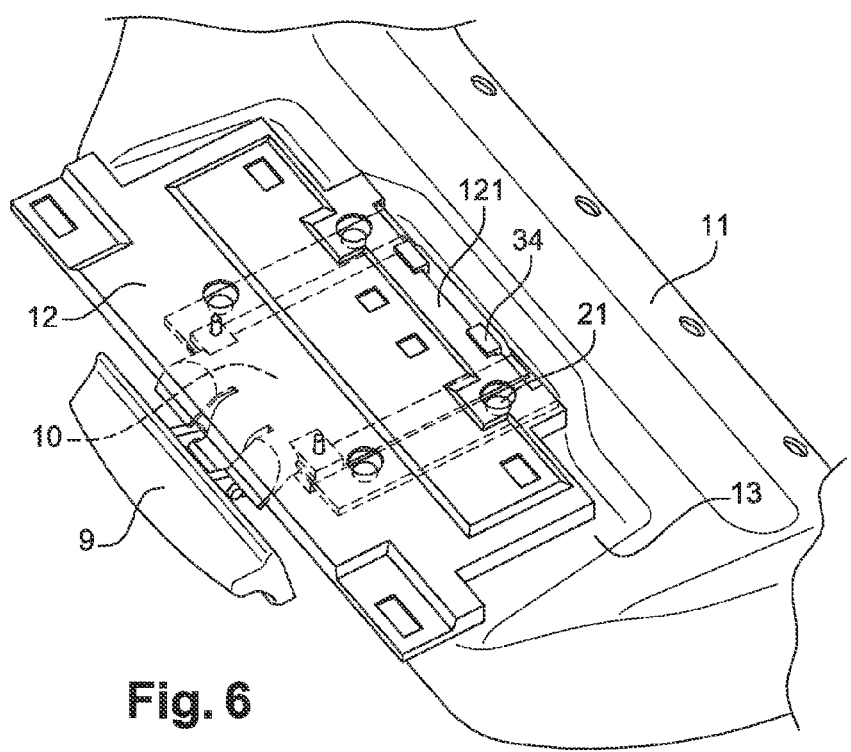
Figure 2:
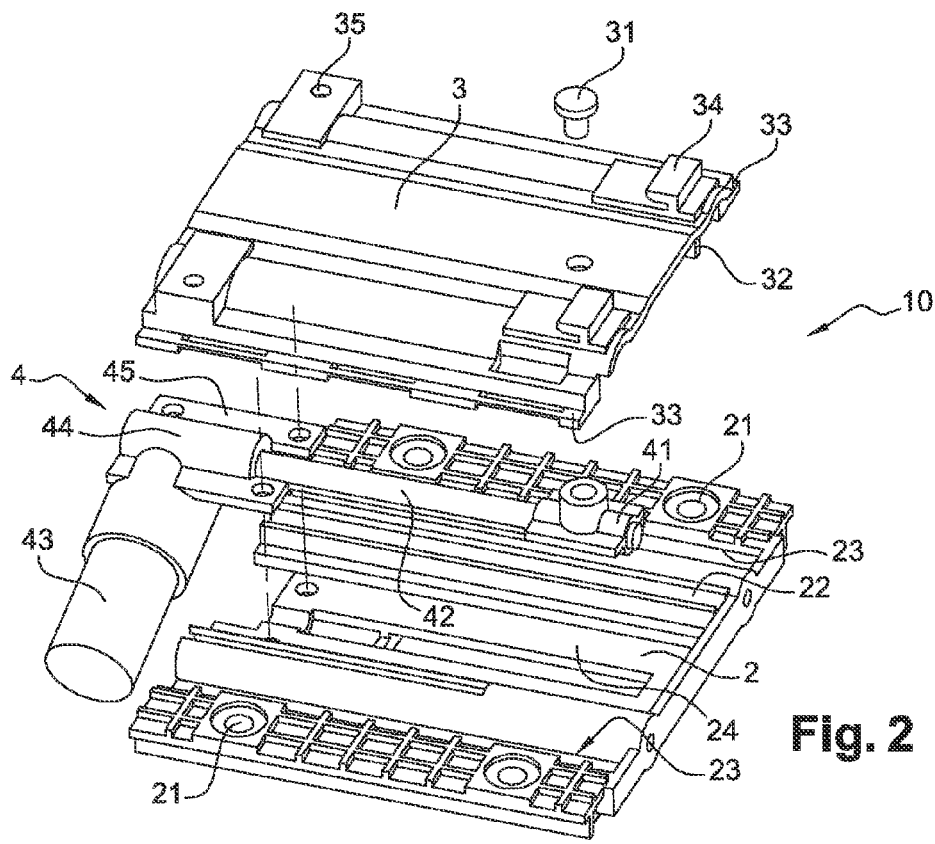
Figure 3:
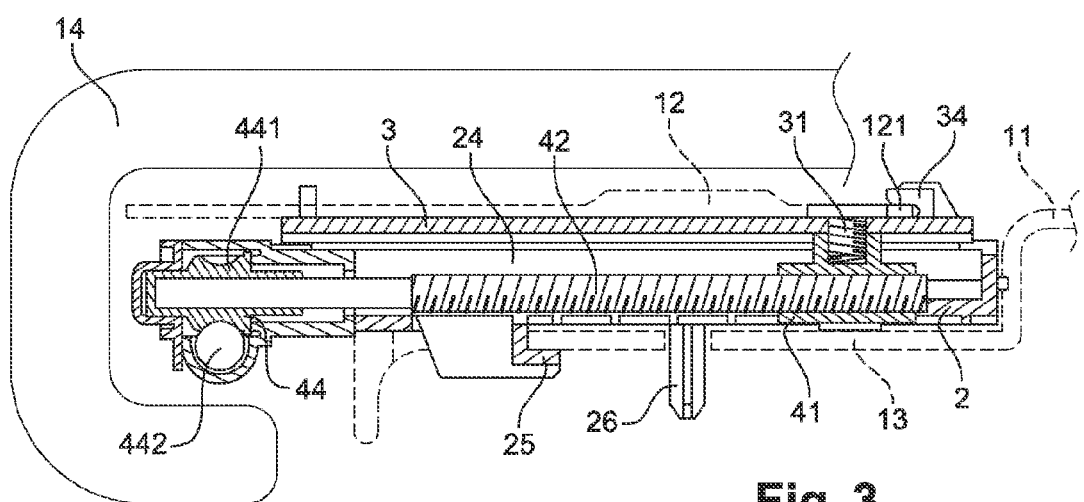
Figure 4:
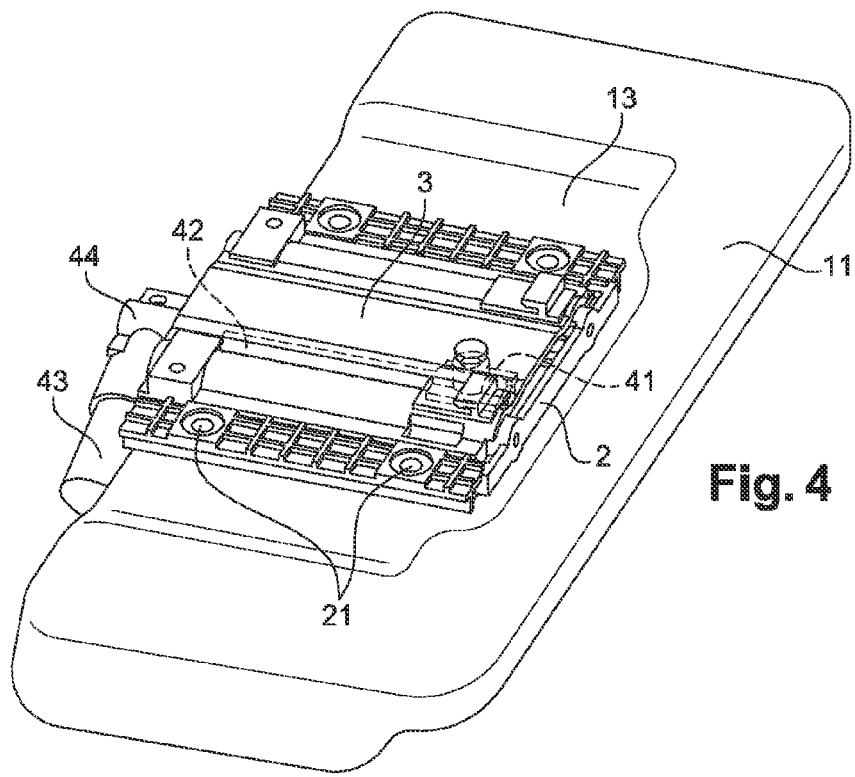
Figure 5:
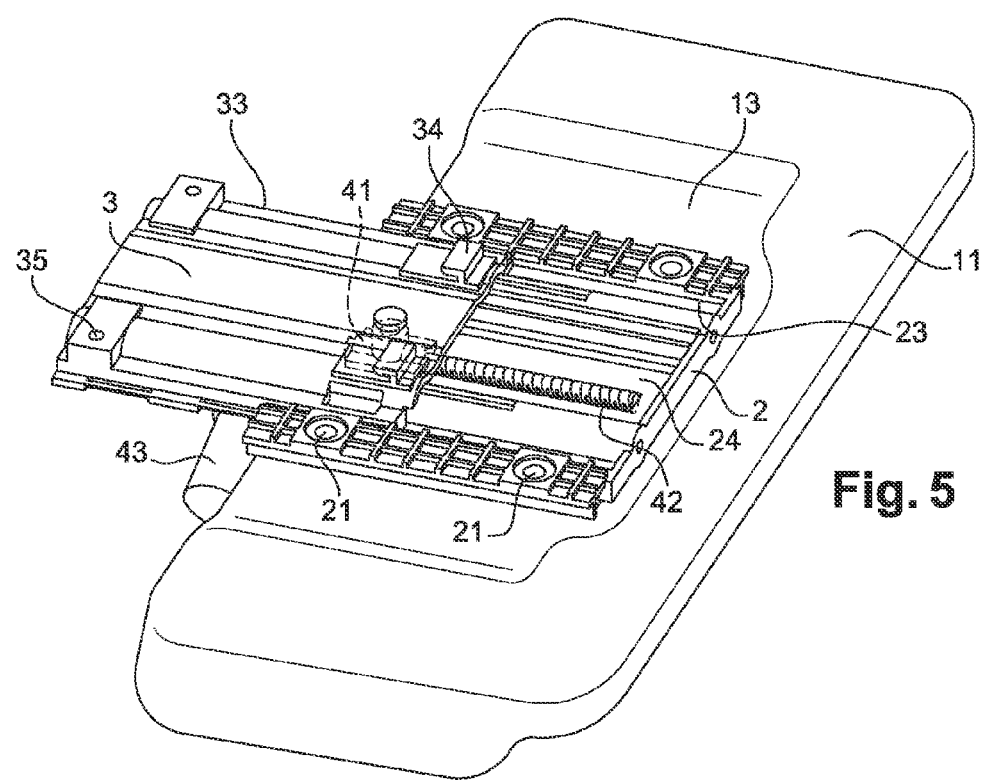

Reference will be made to the accompanying drawings, among which:

FIG. 1 is a partial perspective view of the seating frame provided with the adjustment device and showing the situation of the device relative to the frame and relative to the seat nose, FIG. 2 is an exploded view of the device, FIG. 3 is a longitudinal cross-section view of the device, in a median vertical plane, FIG. 4 is a perspective top view of the device, the carriage having reached its backwards stop, and does not show the seat nose plate, FIG. 5 is a view similar to FIG. 4, the carriage being in forward position, FIG. 6 is a view similar to FIG. 1 of a manually-operated device especially using a fixed support, a carriage, and a seat nose plate identical to those of the invention, to illustrate the modularity of the device.

FIG. 1 partially shows seating frame 1, typically made of an embossed plate, comprising a front crosspiece 11, the front of the seat being located to the left in the different drawings. Plate 12 supporting the seat nose is fastened to adjustment device 10, which is itself fixed in a clearance 13 formed by embossing on crosspiece 11. The shape of the padding of seat nose 14 has been schematized in FIG. 1 by the outline of the padding cross-section.

Adjustment device 10, better shown in FIGS. 2 and 4 to 6, comprises:
- a fixed support plate 2, attached to crosspiece 11,
- a carriage 3 slidably guided on fixed support 2,
- motor-driven control means 4 for controlling the sliding of carriage 3 with respect to fixed support 2.

Fixed support plate 2 comprises a hook 25 and centering elements 26 for positioning the plate on crosspiece 11, and fastening holes 21 for fastening it to crosspiece 11 by screwing or riveting, for example. Fastening holes 21 are located on lateral edge areas of the support plate.

Carriage 3 is slidably guided on fixed support plate 2 by a double set of slide rails:
- a first slide rail, located in a median area, is formed by a rib 32 formed on the bottom surface of carriage 3 sliding in a groove 22 formed in guide plate 2,
- a second slide rail, formed by two parallel grooves 23, formed in the vicinity of the lateral edges of support plate 2, where ribs formed by lateral edges 33 of carriage 3 are slidably inserted, with a play, in the horizontal plane.

The first slide rail provide the guiding in the horizontal plane, and the second slide rail system is only used to maintain the carriage in the vertical direction against guide plate 2, the previously-mentioned horizontal play enabling to avoid risks of jamming by buttressing of the carriage in the support plate.

A central space 24 is provided between support plate 2 and carriage 3. The motor-driven control means comprise a screw-nut system 41, 42, which is arranged in this central space, nut 41 being fixed to carriage 3 by a screw 31 or another equivalent fastening means, and screw 42 extending along the sliding direction and being rotated by motor 43 via a reducer 44 having a wheel 441 and a worm 442. Further, screw 42 of the carriage translation screw-nut system is maintained fixed in its axial direction by its connection with wheel 441 of reducer 44.

Motor-reducer assembly 43, 44 is arranged at the front of support plate 2 and under the trajectory of carriage 3, to avoid hindering the sliding of the carriage, as can be seen in FIGS. 3 and 5. The motor-reducer assembly is preferably directly fastened to support plate 2, for example, by case 45 of the reducer assembled on said plate, as can be understood from FIG. 2.

Seat nose plate 12 is connected to carriage 3 by engagement of its rear edge 121 into hooks 34 formed on carriage 3, and then forward screwing into holes 35 of the carriage.

FIG. 6 shows, instead of a motor-driven device according to the invention, a manually-operated adjustment device having its positioning and its locking in position controlled by a handle 9. The operating principle of such a manually-operated device has especially been described in French patent application no 1053021. The representation of FIG. 6 enables to see the exact correspondence of the outer shapes of device 10, of plate 12, and of the means for connecting the plate to the device, according to the present invention and shown in FIG. 1, with the corresponding elements of the manually-operated device of FIG. 6. FIGS. 1 and 6 thus show that the modular construction of the device enables to use support 2, carriage 3, plate 12, and the various means for assembling and fastening these elements, not only for the device according to the present invention, but also for a manually-operated adjustment device, capable of being assembled on motor vehicle seats of a different line. Such a modularity and adaptation thus enables to produce the common parts in larger series, and thus more economically, and also enables to simplify assembly operations on the seat, since they are identical for the motor-driven and manually-operated versions of the adjustment device.

It should incidentally be noted that central space 24 between the carriage and the support plate may also be adapted to house the components of such a manual sliding and locking control system, for example, resilient return means acting to have the carriage slide and locking elements controlled by handle 9 to block it in a desired position. For further details regarding such configurations, reference may be made to previously-mentioned French patent application no 1053021.

The present invention is not limited to the embodiment which has just been described as an example only. The driving system may be modified, the gear motor being for example connected to the carriage. The wheel and worm system may also be inverted, the motor rotating the nut and the screw being maintained rotationally fixed. The slide rails may also be modified or completed by means providing a reinforcement of the seat nose plate with respect to the crosspiece.

The invention claimed is:

1. A device for adjusting the seating length of a motor vehicle seat, the device comprising:
    a seating frame having a front crosspiece defining a front edge;
    a seat nose plate for supporting a padding, the seat nose plate being mobile with respect to the seating frame;
    a carriage slidably driven on a fixed support fixed to the seating frame, the seat nose plate being assembled on the carriage, the carriage and the fixed support located above the seating frame and under the seat nose plate; and
    a motor-driven control means for controlling the sliding of the carriage with respect to the fixed support, the motor-driven control means comprising a motor located in front of the front edge of the seating frame and under a trajectory of the seat nose plate, and a screw-nut system arranged in a central space between the fixed support and the carriage.

2. The device of claim 1, wherein the motor is fixed with respect to the seating frame.

3. The device of claim 2, wherein the motor is fixed to the fixed support.

4. The device of claim 1, wherein the driving of the carriage is performed by the screw-nut system which comprises a screw and a nut, the screw arranged longitudinally along a carriage sliding direction.

5. The device of claim 4, wherein the screw of the screw-nut system is rotated by the motor, and the nut is fastened to the carriage.

6. The device of claim 1, wherein the motor-driven control means further comprises a worm reducer.

7. A motor vehicle seat comprising:
- a seat bottom piece of adjustable length, the seat bottom piece comprising:
  - a seating frame having a front crosspiece defining a front edge; and
  - a seat nose plate for supporting a padding, the seat nose plate being mobile with respect to the seating frame; and
- a device for adjusting the seating length, the device comprising:
  - a carriage slidably driven on a fixed support fixed to the seating frame, the seat nose plate being assembled on the carriage, the carriage and the fixed support located above the seating frame and under the seat nose plate; and
  - a motor-driven control means for controlling the sliding of the carriage with respect to the fixed support, the motor-driven control means comprising a motor located in front of the front edge of the seating frame and under a trajectory of the seat nose plate, and a screw-nut system arranged in a central space between the fixed support and the carriage, the motor hidden by the padding of the seat nose plate.

8. The motor vehicle seat of claim 7, wherein the motor is fixed with respect to the seating frame.

9. The motor vehicle seat of claim 8, wherein the motor is fixed to the fixed support.

10. The motor vehicle seat of claim 7, wherein the driving of the carriage is performed by the screw-nut system which comprises a screw and a nut, the screw arranged longitudinally along the carriage sliding direction.

11. The motor vehicle seat of claim 10, wherein the screw of the screw-nut system is rotated by the motor, and the nut is fastened to the carriage.

12. The motor vehicle seat of claim 7, wherein the motor-driven control means further comprises a worm reducer.

13. A device for adjusting the seating length of a motor vehicle seat, the device comprising:
- a seating frame having a front edge;
- a seat nose plate for supporting a padding, the seat nose plate being mobile with respect to the seating frame;
- a carriage slidably driven on a fixed support fixed to the seating frame, the seat nose plate being assembled on the carriage, the carriage and the fixed support located above the seating frame and under the seat nose plate; and
- a motor-driven control means for controlling the sliding of the carriage with respect to the fixed support, the motor-driven control means comprising a motor located in front of the front edge of the seating frame and under a trajectory of the seat nose plate, and a screw-nut system arranged in a central space between the fixed support and the carriage.

* * * * *